(12) United States Patent
Neff et al.

(10) Patent No.: US 7,135,976 B2
(45) Date of Patent: Nov. 14, 2006

(54) WIRELESS MONITORING DEVICE

(75) Inventors: Raymond Lynn Neff, Half Moon Bay, CA (US); Fred Barrett, Allyn, WA (US)

(73) Assignee: RFTrax, Inc., Sugar Land, TX (US)

( * ) Notice: Subject to any disclaimer, the term of this patent is extended or adjusted under 35 U.S.C. 154(b) by 9 days.

(21) Appl. No.: 10/813,150

(22) Filed: Mar. 29, 2004

(65) Prior Publication Data

US 2004/0233054 A1    Nov. 25, 2004

Related U.S. Application Data

(60) Provisional application No. 60/458,260, filed on Mar. 31, 2003.

(51) Int. Cl.
  *G08B 13/14* (2006.01)
(52) U.S. Cl. .............................. 340/572.1; 340/539.13; 340/988; 700/229; 705/22
(58) Field of Classification Search ........... 340/539.13, 340/988, 572.1, 10.1, 825.34; 705/22, 28; 700/229, 225, 224; 235/385, 384
See application file for complete search history.

(56) References Cited

U.S. PATENT DOCUMENTS

| | | | | |
|---|---|---|---|---|
| 5,021,790 | A * | 6/1991 | Ohta et al. | 342/44 |
| 5,448,220 | A * | 9/1995 | Levy | 340/539.26 |
| 5,745,049 | A * | 4/1998 | Akiyama et al. | 340/870.17 |
| 5,748,085 | A * | 5/1998 | Davis et al. | 340/572.1 |
| 6,630,885 | B1 * | 10/2003 | Hardman et al. | 340/505 |
| 6,804,578 | B1 * | 10/2004 | Ghaffari | 700/229 |
| 6,806,808 | B1 * | 10/2004 | Watters et al. | 340/10.41 |
| 6,891,470 | B1 | 5/2005 | Bohinc, Jr. | 340/539.26 |
| 2001/0052544 | A1 | 12/2001 | Nishitani et al. | |
| 2002/0149481 | A1 * | 10/2002 | Shanks et al. | 340/572.1 |
| 2002/0158761 | A1 * | 10/2002 | Runyon et al. | 340/572.1 |
| 2003/0020611 | A1 * | 1/2003 | Script et al. | 340/568.1 |
| 2003/0117268 | A1 | 6/2003 | Hewitt et al. | |
| 2004/0060976 | A1 | 4/2004 | Blazey et al. | |
| 2004/0066296 | A1 | 4/2004 | Atherton | |
| 2004/0098272 | A1 | 5/2004 | Kapsis et al. | |
| 2004/0111335 | A1 | 6/2004 | Black et al. | |
| 2004/0113786 | A1 | 6/2004 | Maloney | |
| 2004/0119593 | A1 | 6/2004 | Kuhns | |
| 2004/0124982 | A1 | 7/2004 | Kovach | |
| 2004/0129769 | A1 | 7/2004 | Kovach | |
| 2004/0143505 | A1 | 7/2004 | Kovach | |
| 2004/0160323 | A1 | 8/2004 | Stilp | |

* cited by examiner

*Primary Examiner*—Brent A. Swarthout
(74) *Attorney, Agent, or Firm*—Jackson Walker L.L.P.; Mark A. Tidwell, Esq.

(57) ABSTRACT

The system of the invention includes a method for monitoring changes in the status or condition of a Container using one or more monitoring units mounted to the Container. The monitoring units preferably include a power supply, sensors using reflective energy with programmable parameters, globally-unique sensor identification, recording capability on a timeline, long term memory and the ability to rebroadcast information on RFID radio technology. Programmable monitoring hardware in the monitoring unit detects significant changes in the sensor outputs as a triggering event. The programmable monitoring hardware includes memory for storing identification information for the Container. The sensors which can include conventional devices that detect various forms of energy including visible light, infrared light, magnetic fields, radio frequency energy and sound. In one embodiment, a monitoring unit is mounted inside a shipping Container suitable for long distance transport. The triggering event can be used for tamper detection security.

11 Claims, 4 Drawing Sheets

WIRELESS MONITORING DEVICE

PRIOR RELATED APPLICATION

This application claims priority under 35 U.S.C. 119(e) for the provisional application filed on Mar. 31, 2003 by one of the inventors hereof bearing Ser. No. 60/458,260 entitled "Tamper detection security device that monitors the presence of the door on a shipping container using reflective energy proximity sensors and radio frequency identification technologies."

FIELD OF INVENTION

The invention relates to methods and systems to monitor the condition or security of containers, crates or shipping cartons and recording that information for transmission using Radio Frequency Identification technology.

BACKGROUND OF THE INVENTION

Radio frequency identification tags (hereinafter referred to as "RFIDs") are well-known electronic devices which have uses in many areas including freight transportation and retail product tracking. An RFID works by first recording or "burning in" identification or other data into memory in the RFID device. Thereafter, the RFID sends the recorded identification or other information to an RFID reading device. A particular advantage of RFIDs over bar code, optical characters and magnetic storage (such as the magnetic strip on many credit cards) is that the RFID does not require physical contact, or as is the case with optical character and bar code readers, line of sight, between the tag and the reading device to be read. Some currently available active tags can be read at distances up to 300 feet through typical crates and containers used during shipping.

RFIDs come in two varieties: active and passive. An active RFID includes a battery or other power source, and is activated by a signal from a reading device. The activated RFID then broadcasts its identification or other data, which is picked up by the reading device. Some active tags have memory chips on which data can be written and received remotely. An advantage of active RFIDs over passive RFIDs is that the inclusion of a power source allows the active RFID to transmit to a receiver without entering into an electromagnetic field to power the tag circuit. Active RFIDs are also generally able to transmit over a longer distance and be activated individually. The advantage of active RFIDs has led to its use in automatic toll-paying systems, or the like.

Passive RFIDs have no power supply per se, but power is provided to the RFID circuitry by using an electromagnetic power receiver. The RFID reading device sends power to the RFID's electromagnetic power receiver, thus powering up or turning on the RFID's circuits. Next, the passive RFID broadcasts a response signal containing identification or other information, which is then read by the reading device. Because the passive RFID has no battery, it is less expensive and lighter. Passive RFIDs have been in use for some time, notably in security access cards where the user holds the card near the card reader to unlock a door, and in clothing stores as security tags attached to clothing items.

Active tags can be contacted individually or in groups by a computer equipped with RF transmission capability (hereinafter referred to as a "Reader"). A reader can be a handheld, transportable device or it can be mounted in a fixed position Fixed readers work with an antenna array arranged around a portal and read all tags that pass through that portal. Fixed readers can be much more selective in that they read only the tags that pass through the portal. Fixed readers can also tell the direction the tag was moving as it passes through the portal and can do so at speeds at 40 or 50 miles per hour.

Proximity sensors, or sensors that can sense the presence or absence of an object without physical contact are available in many forms. All of these devices have the common functionality in that they generate and transmit or direct energy and receive back portions of that energy as it is reflected back from the target and thereby detect the presence or absence of the target or in this case the door. Some types of these sensors are described below. Hall Effect Sensors employ a magnetically biased semiconductor, Hall element to sense moving objects. Light Feedback or fiber optic sensor: the emitter and receiver can be in the same housing or side-by-side. The emitter sends out a beam of pulsed red or infrared light which is reflected directly by the target (at any angle), it is diffused in all directions and some light is reflected back. The receiver sees only a small portion of the original light, switching the sensor when a target is detected within the effective scan range. Ultrasonic Proximity Sensor: This device allows for alternate transmission and reception of sound waves. The transducer emits a number of sonic waves which are reflected by an object, back to the transducer. After emission of the sound waves, the ultrasonic sensor will switch over to receive mode. The time elapsed between the emitting and receiving is proportional to the distance of the object from the sensor. Radio Frequency Sensors use pulsed RF source for reference RF Power value, the Diode receiver is polled for average baseline value every T seconds. Changes in baseline value reflect movement. All of the above items and similar devices will hereinafter be referred to as "Sensors".

Shipping containers, crates, cartons, and boxes (hereinafter referred to as "Containers") have long been a target for theft and are a security threat because not only are items stolen out of them, but terrorist devices or contraband can be placed inside them. In the past shipping containers have been ordinarily protected by the use of locks or other physical impediments to entry. Physical seals have also been used so that a quick visual inspection can determine if the seal has been broken. More recently the seals and locking devices have become more sophisticated and some contain RF devices that broadcast RF alerts when the seal is physically broken. Some of the RFID seals contain fiber optic cables or wires which signal a fault when cut or broken. Some contain micro switches, magnetic latches, or contact switches. All of these require some mechanical or electromechanical device to determine the fault before it is broadcast on the RF communication tag.

SUMMARY OF THE INVENTION

The system of the invention includes a method for monitoring changes in the status or condition of a Container using one or more monitoring units mounted to the Container. The monitoring units preferably include a power supply, sensors using reflective energy with programmable parameters, globally-unique sensor identification, recording capability on a timeline, long term memory and the ability to rebroadcast information on RFID radio technology. Programmable monitoring hardware in the monitoring unit detects significant changes in the sensor outputs as a triggering event. The programmable monitoring hardware includes memory for storing identification information for the Container. The sensors which can include conventional devices that detect various forms of energy including visible light, infrared light, magnetic fields, radio frequency energy and sound. The event can be logged for subsequent readout and/or an immediate RF transmission can be generated. In one embodiment, a monitoring unit is mounted inside a shipping Container suitable for long distance transport. The sensor is disposed so that opening and closing the Container door creates a change in the sensor output which is detected as a triggering event by the monitoring hardware. The triggering event can be used for tamper detection security. The status and logged information contained in the monitoring unit can be read by RF communication with any suitably equipped device including handheld devices and laptop computers.

DETAILED DESCRIPTION OF THE PREFERRED EMBODIMENTS

Various modifications to the preferred embodiments described below will be readily apparent to those of ordinary skill in the art, and the disclosure set forth herein may be applicable to other embodiments and applications without departing from the spirit and scope of the present invention and the claims hereto appended. Thus, the present invention is not intended to be limited to the embodiments described, but is to be accorded the broadest scope consistent with the disclosure set forth herein.

Figure 1:
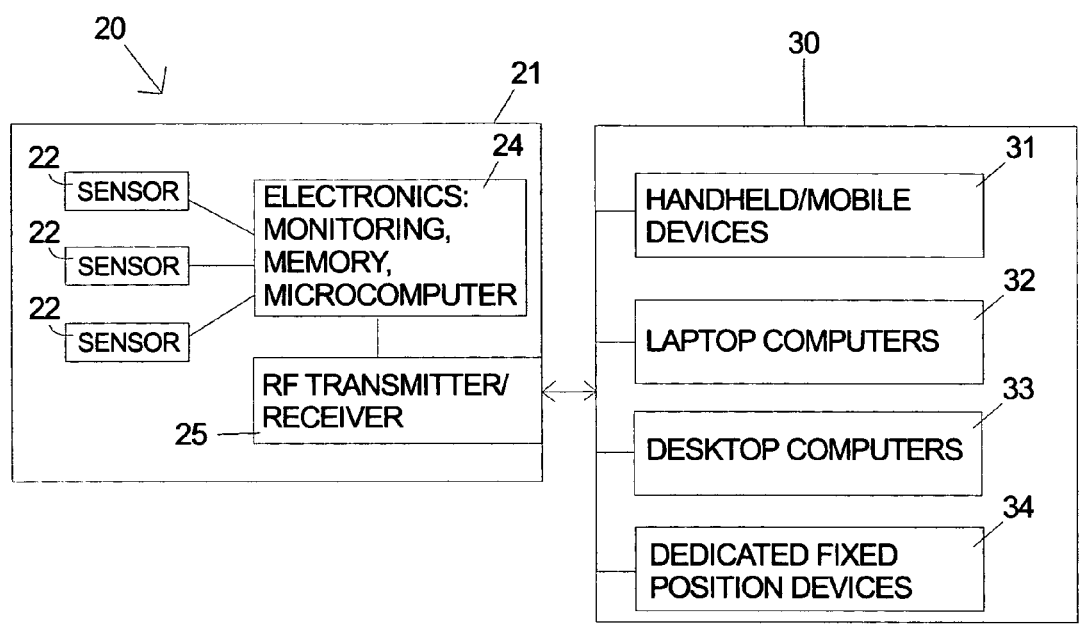
FIG. 1 illustrates an embodiment of a system according to the invention using either handheld, laptop, or desktop computer equipped with PCI card and antenna communicating with Monitoring Units.

A system 20 according to the invention is described in FIG. 1. This system 20 includes one or more Monitoring Units 21 and one or more Readers 30 which are devices for reading information from or communicating with the monitoring units 21 such as hand-held/mobile devices 31, laptop computers 32, desktop computers 33 and/or dedicated fixed position devices 34. Each Reader 30 is equipped with RF capability which for computers can be a commercially available card (not shown) that plugs into a slot in the computer. This card contains a transmitter, receiver, and an antenna. The Readers 30 preferably send and receive radio signals to and from the Monitoring Units 21. The Monitoring Unit 21 includes one or more sensors 22 and an RF Transmitter/Receiver 25. The RF capability can be limited to transmission only for some applications. The intelligence of the Monitoring Unit 21 is built into the Monitoring Electronics 24 which includes a microcomputer, memory and interface hardware for connecting to the sensors 22. The program or firmware to control the Monitoring Electronics 24 is developed using standard programming equipment and techniques. Each Monitoring Unit 21 includes the capability of an active RFID tag in that it has memory for storing identification information associated with the Container to which it is attached. The RF Transmitter/Receiver 25 can have an address or ID associated with it which is used to identify transmissions from it and to it that is separate from the identification information for the Container. Any radio device capable of being contacted directly and identified as a unique individual unit from its signal is an RFID radio and can be used within the scope of this invention. Some examples are GSM cell phones, Ultrawideband radios, Satellite radios and Spread Spectrum radios. Any of the radios described above can be substituted for RF Transmitter/Receiver 25. Since the Monitoring Unit 21 is intended to be move with the Container, a self-contained power supply such as a battery (not shown) is needed.

In a particular application, large numbers of the Monitoring Units 21 can be used simultaneously in freight yard, warehouse, etc. Various Containers can each be equipped with a Monitoring Unit 21. The Monitoring Units 21 can be contacted by RF transmission and respond individually or in groups. The distances between the Readers 30 and the Monitoring Unit 21 are a function of the actual RF Transmitter/Receiver 25 and the various environmental factors such as the physical characteristics of the Container, but typically distances up to 300 feet are practical and the signal can pass through the walls or gaps in the walls of a shipping Container or an external antenna can be mounted on the outside of the Container and wired to the RF Transmitter/Receiver 25. Active RFID technology is commercially available, and the invention can be implemented in part using the active RFID technology. The sensors 22 are used to monitor changes in the environment in the Container. For example, the opening and closing of a door can be detected. The sensors 22 can also be used to detect movement of the cargo or intrusion into the Container. The sensors 22 typically use reflected energy and, for example, can sense the presence of the door by sending and receiving back reflective energy. This method utilizes no wires or fiber optic cables that need broken or cut to sound an alarm, nor does it require switches or electromagnetic contacts to operate or sound the alarm. The invention is not limited to any particular type of sensor. Sensors 22 which can be usefully included in a Monitoring Unit 21 according to the invention include conventional devices that detect various forms of energy including visible light, infrared light, magnetic fields, radio frequency energy and sound.

Figure 2:
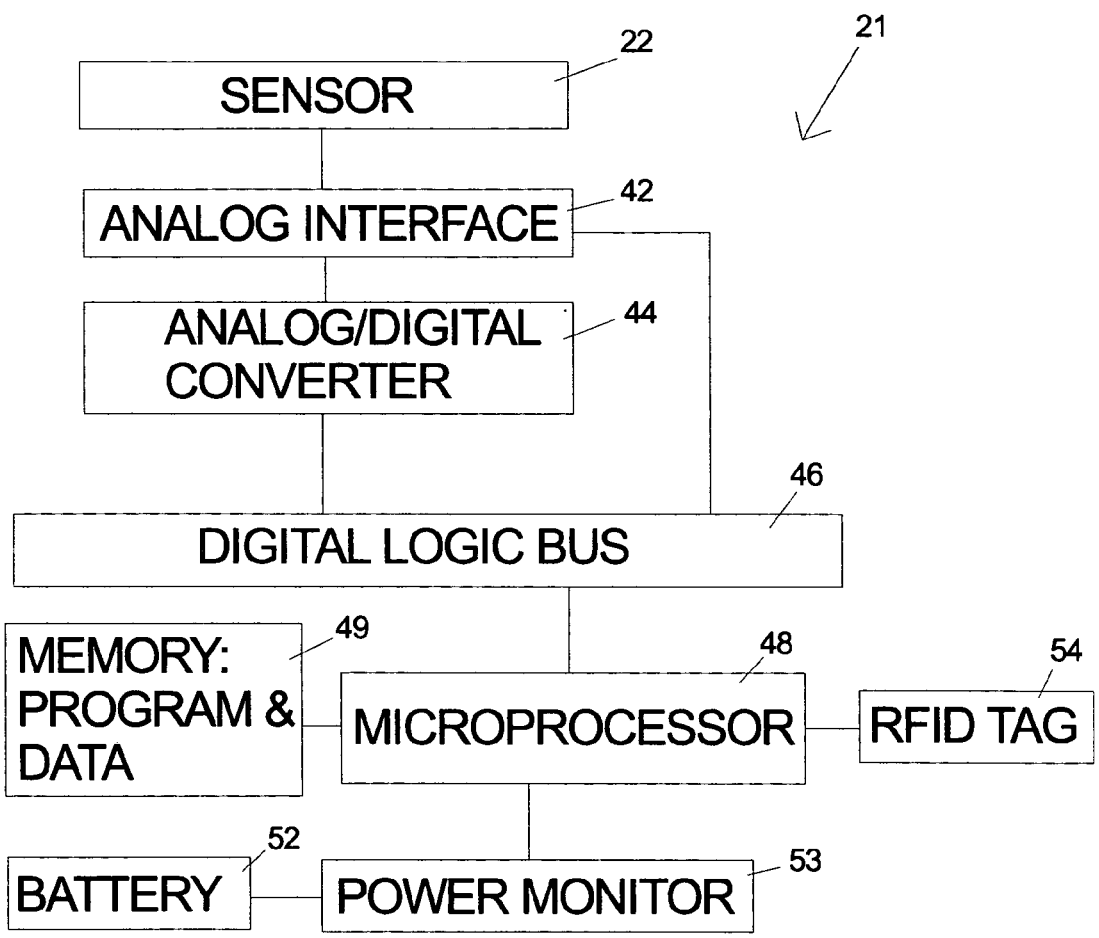
FIG. 2 illustrates an embodiment of a Monitoring Unit according to the invention.

FIG. 2 illustrates an embodiment the Monitoring Unit 21 using an RFID Tag 54. This embodiment can be used as a tamper detection security. The sensor 22 is connected to an appropriate analog interface 42 which is in turn connected to an analog-to-digital (A/D) converter 44. The analog interface 42 may also be connected directly to the digital logic bus 46, since some microcomputer devices have A/D converters built-in. The microprocessor 48 executes a control program stored in memory 49. The microprocessor 48 and memory 49 can be part of a single integrated circuit such as a microcomputer. The power is supplied by battery 52 which is monitored by power monitor 54. In this embodiment the RF communication is performed by self-contained RFID) Tag 54 which is connected to the microprocessor 48. The self-contained RFID tag consists of a RF circuit, a battery, an antenna, logic circuitry and nonvolatile memory on which a timeline is recorded as part of its software program. This timeline enables an event to be recorded and recovered along with the time that it occurred. When a triggering event such as the opening of the door is detected by monitoring the sensor, the fault signal is stored on the volatile memory until it can be transferred to the timeline in the self-contained RFID tag. This information can then be read by a Reader.

In accordance with a preferred embodiment of the invention, the invention provides a method for using a Monitoring Unit 21 to monitor the security of any container, crate or shipping carton by monitoring the condition such as the position of the door or opening device and recording that information for immediate or subsequent transmission. More specifically, the door's position, etc. is monitored by sending energy and receiving the energy back to a sensor as it is reflected off the door. When the door is opened the energy being received by the sensor changes, and a fault condition occurs. The fault signal is then rebroadcast immediately and/or recorded with a relative or real-time timestamp for transmission by an RF communication signal.

This device depending on its mounting location allows the door, door jam, doorframe, mobile opening, or removable side (hereinafter referred to as the "Door") to be monitored using a Sensor instead of a physical seal or an electromechanical switch. The device allows the fault condition which is detected by the sensor when the Door is moved to be recorded with a timestamp accessible to a RFID tag where it is available for transmission to an RFID Reader.

The Sensor 22 is preferably placed in close proximity to the Door, cargo or other monitoring target. The maximum distance is limited by the capability of the Sensor. The Monitoring Unit 21 can be mounted with screws, magnets, etc. preferably on the inside of the Container. The Sensor is preferably mounted with the energy emitter and receiver aimed at the target with no impediments between the Sensor and the target. When the target moves or is disturbed the Sensor will detect the difference or absence of the reflective energy off of the target. The difference or absence of energy indicating movement of the target is a fault or triggering event. This Sensor 22 can be similar to the commercially available SICK ELF Sensor in the document labeled SIC Technical Information.

A signal indicating a fault is then detected by the microprocessor 48 or other logic circuit where it is stored in the memory which may be separate from or internal to the microprocessor or microcomputer as shown in FIG. 2. Because it is useful to know when the fault occurred and necessary to record the next fault, the microprocessor holds the information on the fault in its volatile memory until it can be recorded in its non-volatile memory on a relative timeline or using a time stamp from a real-time clock. Once in non-volatile memory the information on the fault is accessible to be read by the RFID tag 54. Once the fault is recorded in non-volatile memory, the microprocessor clears the fault condition from its memory and is once again available to receive the next fault.

The RFID tag 54 used in the embodiment of invention described above can be a commercially available Identec Solutions i-Q Series described in the document Active UHF Tag i-Q Series. The RFID tags used in this invention are active and must have the capacity to access the fault information including the timestamp or as in the case of the Identec i-Q tag have a time-stamping capability which is actually part of the tag's memory capability. In this embodiment the Identec tag takes the fault information directly from the microprocessor via an outside lead and stores the fault on a timeline in the memory of the Identec tag. The advantage of the above method is that the timeline can be extended due to the magnifying effect of using two devices with memory. An example of this is as follows. The iQtag from Identec with a 5 year battery life and a 32K memory can record 13,312 events or readings on a timeline which means to cover a shipping time of 30 days it can read the sensor every 20 seconds. To provide adequate protection on the door the sensor must be monitored continuously or at least every couple of seconds. One way to accomplish this is to record the event as described above and hold it in the volatile memory for over 20 seconds until it can be recorded on the non-volatile memory which is activated every 20 seconds by the Identec tag. The disadvantage of this method is that the time of the fault as it is recorded is only accurate within 20 seconds. In this embodiment the sensor is always in the on position as is the Identec tag. Because the sensor records a fault when no energy is reflected back to the sensor a fault condition will always appear if the battery is disconnected, removed, or goes bad. Likewise, proper function will be evident and indicate a successful installation when there is an absence of a fault. This information can be read and tested using a reader at the time of installation.

In an alternative embodiment of the Monitoring Unit 21 of the invention the RFID Tag 54 need not have a timeline storage capability. In this embodiment, when the triggering event occurs the fault signal from the Sensor 22 is stored on a timeline or real-time clock in the memory 49 of the Monitoring Unit 21 where it is available to the RF circuit to be read by a Reader. In this case the microprocessor would be programmed to monitor the sensor continuously or turn on the sensor in predetermined intervals to look for a fault condition. When a fault occurs it would be rebroadcast immediately or recorded directly on the timeline or real-time clock in the logic circuit of the microprocessor. The same microprocessor would also provide memory and an interface with and logic for the RFID circuit, in this embodiment the microprocessor can be accessed directly via the RFID circuit to accomplish additional functions such as turning the door sensor off and on. Reading the values from the sensor to determine if it is functioning correctly, changing the gain or sensitivity on the sensor to adjust or calibrate the sensor due to differences in the sensors mounting distance from the door, or reflective values of its environment.

For the purpose of this invention it is not important whether the logic controlling, and monitoring the sensor and the timeline or real-time clock are actually part of the RFID circuit and its memory or held on a separate memory accessible to a self contained RFID tag with memory so long as the fault information is readily available for immediate transmission or stored with a timestamp accessible for subsequent transmission.

After the fault is recorded on the long-term memory associated with a timestamp and where it is accessible to the RFID circuit, it must be transmitted to a Reader 30 to be used. RFID tags can be read with either fixed or hand-held Readers. Readers can also work as re-broadcasting devices reading the information on the tag and then transmitting that information via a long-range technology.

Figure 3:
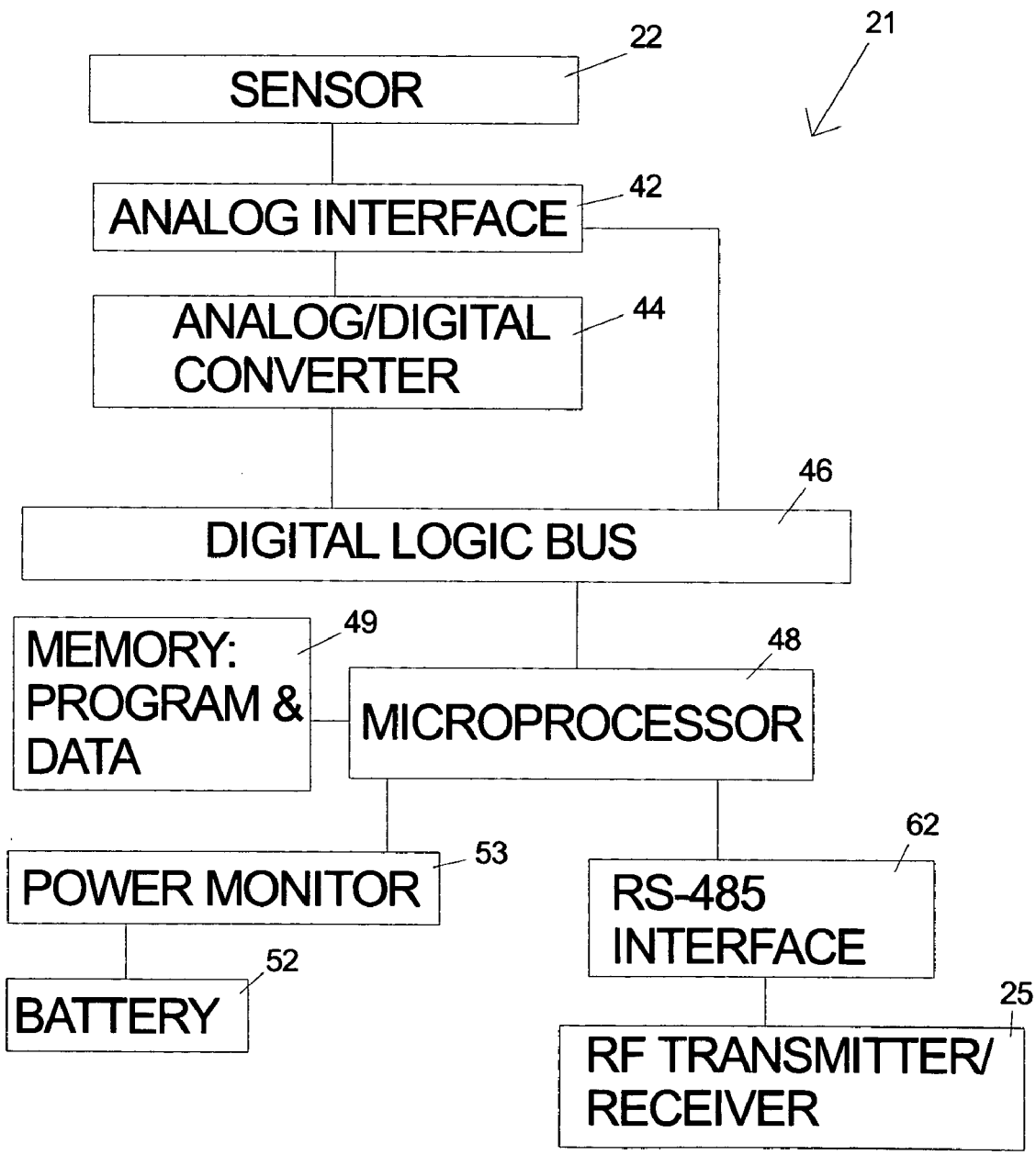
FIG. 3 illustrates an embodiment of a Monitoring Unit according to the invention using an RS485 serial interface to interface with different kinds of RF devices.

An alternative embodiment of the Monitoring Unit 21 illustrated in FIG. 3 uses an RS485 serial interface 62 to transmit the data from the microprocessor 48 to the radio transmitter/receiver 25 which can be any of the alternatives as described above. In this embodiment of the invention the Monitoring Unit 21 is self-contained and does not rely upon the capabilities that are supplied by an RFID Tag. All functional control, logic and memory are contained within the Monitoring Unit 21 and its firmware and the radio is for communication only.

The Monitoring Unit 21 contains memory that is used to store important information relating to the container, such as owner name, container contents or inventory, and contact information relating to the particular shipment being monitored. In addition, the Monitoring Unit 21 contains data that is logged from the sensor(s), such as the state of the container door (security alerts). Encryption of data that is sensitive in nature is handled by the Readers. Thus, the application programs for the Reader must encrypt the data when it is written to the Monitoring Unit 21 or RFID tag 54 memory. In this way, only authorized Readers and users may see the data, and the select few with appropriate authority may make changes to that data. Any unauthorized attempts to alter the data results in a breach of the electronic envelope, and once the electronic seal is broken, then a fault condition is raised and appropriate notifications can be made. The data can be written in a three-step encryption process: First, the data that is to be written is encrypted using RSA-standard encryption algorithms (64-bit, 128-bit or 1024-bit depending on the country using the application). An initial checksum key is stored in the data stream to be used upon decryption to certify the data structure is intact. The resulting data is then preferably compressed using prior art compression methods in order to both optimize space in tag memory as well as provide additional scrambling of data.

Upon reading the data from the Monitoring Unit 21, the process is reversed by the Reader. At the conclusion of the decryption process, the checksum key is tested for validity, indicating that the data has in fact been returned to its original state. Depending on the authorization of the user, portions or all of the data is made available to the user.

An embodiment of the method of the invention using the Monitoring Unit 21 is as follows. A shipper loads a container with goods to be shipped. Container doors are closed, and using a handheld (or stationary) Reader, the container is recorded as "closed" by the Shipper. The Reader updates the Monitoring Unit 21 with a data packet including (but not limited to): the date and time the container was registered as closed the user name logged into the reader at the time the container was registered as closed owner information, inventory information, and document locations for pertinent shipping information. This data is written to the Monitoring Unit 21 using the process described above. At this time, the Monitoring Unit 21 initializes, calibrates itself and begins monitoring the sensor target: door, cargo, etc. The device will self-calibrate itself creating an average baseline value and then monitor changes in that value which will indicate a fault. All values, or a fault (values that are not within set parameters) can optionally be recorded periodically in the memory of the RFID tag along with a real time clock. Faults will sound an alert, or the recorded record will be available for remote access using RFID technology. The monitoring process continues until the container is received by a waypoint in the shipping process. Upon the Monitoring Unit 21 coming in contact with an authorized Reader, the data is then read into the application software, and the encryption process is reversed, with the application software the testing integrity of data at each process step. The data is then available for review by a user. If the waypoint is the endpoint of the shipment, a user may choose to receive the container. By doing so, the Monitoring Unit 21 is registered as "open".

A Monitoring Unit 21 has a command set to which it responds and which can vary according to the application. Each Monitoring Unit 21 has a unique address to which it responds, but preferably it will also respond to selected broadcast commands which are intended for all Monitoring Units. The broadcast commands can include an otherwise unassigned address such as "00" to indicate that all units should receive the command. However, the units do not respond to broadcast commands, so a typical use of a broadcast command is to wake-up all units in preparation for subsequent individual commands. A NOP command with a Monitoring Unit's address included can also be used to wake-up a unit. Another general command which should be implemented in the Monitoring Unit is "sleep." In the sleep mode, power is conserved. Since various types/embodiments of Monitoring Units are to be anticipated, an identification number which corresponds to the type of Monitoring Unit should be assigned and that identification number should be readable by a command (e.g. "Get Unit ID") issued by a Reader. A command to alter the address (e.g. "Set Address") to which the Monitoring Unit responds is desirable. The "Set Address" command can be helpful in avoiding address conflicts. Reading out the information on faults, etc., stored in the Monitoring Unit 21 is performed by a "Get Response" command. The amount of data returned by the unit will vary with the application.

Figure 4:
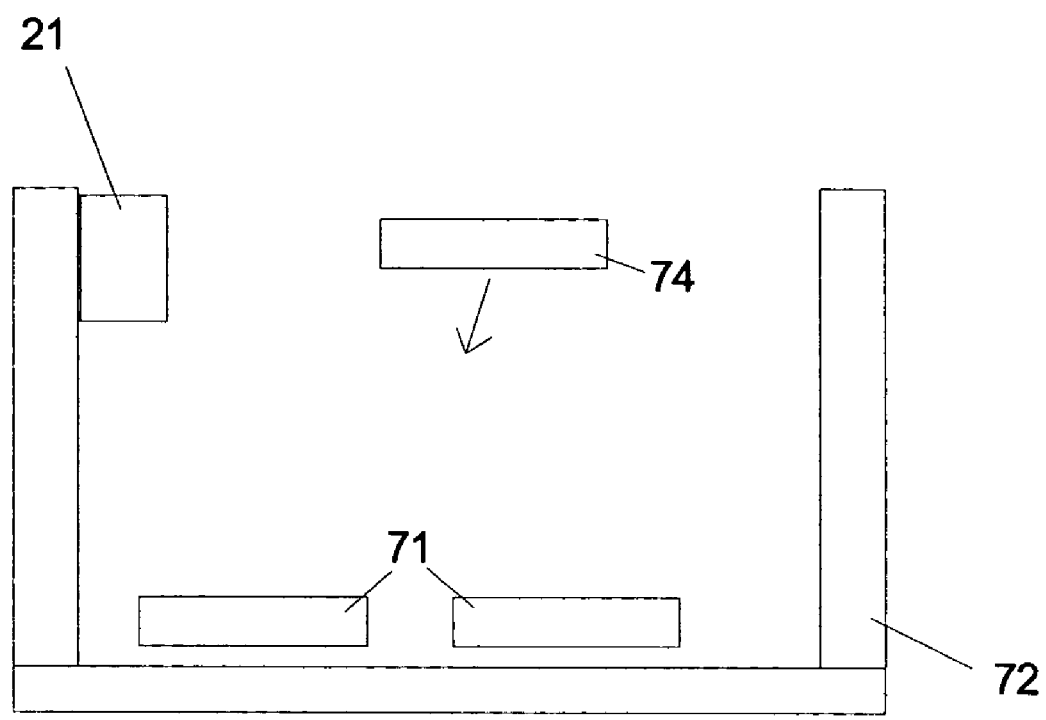
FIG. 4 illustrates the use of a Monitoring Unit according to the invention with a proximity sensor to sense and track items in a supply chain as they are placed into a Container.

In addition to security, this invention can also be used for monitoring and tracking items as they move through a supply chain. Reference is made to FIG. 4. A Monitoring Unit 21 equipped with an appropriate sensor can sense the presence of objects as they move through a supply chain and broadcast that information via the various Readers described herein. Proximity sensors have long been used in the supply chain to monitor and trigger events. Until now these sensors have been hard-wired into fixed locations. With this invention the proximity detectors can be wireless, and therefore mobile, limited only by radio range. The firmware programming in the Monitoring Unit 21 used for object tracking or counting is different from that used for security applications. The triggering event does not imply a fault condition and simply needs to recorded long enough to transmitted to the Reader. As illustrated in FIG. 4 one application for this invention would be to detect objects 71, as they move from one location to another mobile location, or container 72. In this application it would be important to record or note the event on the mobile unit, especially where there were multiple mobile units, and therefore various possibilities as to which mobile unit the object was placed into. In this application each mobile unit would be equipped with one or more sensors 22 aimed at the opening of the mobile unit or container. Each Monitoring Unit 21 would have a radio transmitter 25 which in this application could be transmit only. When an object 74 is placed into the container the proximity sensor 22 in the Monitoring Unit 21 would see the event via a reflected signal and broadcast that event via RF transmitter to a Reader which would note the specific object being placed into specific container. By doing this it would then be possible to track individual objects as they move into the individual containers, and therefore track, and verify that they moved into the correct container 72 being placed there by operators, automatic sorting equipment, etc.

In a preferred embodiment the monitoring of the sensors uses programmable parameters to determine when a triggering event has occurred. Every sensor and application environment has certain levels of noise or extraneous variations in its output that can be considered normal. In order to avoid recording and transmitting irrelevant information, programmable parameters can be used to filter the sensor output. A default set of parameters is written into the Monitoring Unit's nonvolatile memory as a part of the manufacturing process. The selected parameters for a particular sensor can be changed by a command which is transmitted to and received by the Monitoring Unit 21. Examples of parameters are sensor sample rate (how often the Monitoring Unit 21 take a reading), sensitivity or threshold parameters, output type (sensor output goes active as an "On" condition or sensor output goes active as an "Off" condition), alert signal duration (how long the alert is maintained before resetting and preparing for next notification) and boundary parameters such as max temperature, max shock, minimum radiation level, etc are set with default values at the factory.

Preferably the Monitoring Unit 21 includes a sleep mode in which power is conserved. During sleep mode the microprocessor is put into a hibernation state to conserve power. An interrupt driven timer is set to periodically wake-up the wake-up the microprocessor to take readings and perform other tasks. Temperature, humidity, and other static sensors are awakened at predetermined sample rates (see parameters above) and measurements are then taken. Since temperature, etc. can usually be recorded over time, the measurement itself is not necessarily a triggering event to record, therefore it sleeps to conserve power, then wakes up to record the current reading. The log of recorded values is readable upon command received from a Reader.

The invention claimed is:

1. A method for monitoring a transport storage compartment, said method comprising the steps of:
   positioning a monitoring unit having a sensor and a transmitter inside said storage compartment;
   utilizing said sensor to monitor the physical condition of the inside surface of the storage compartment; and
   utilizing said transmitter to transmit a signal based on the physical condition of the inside surface of the storage compartment,
   wherein the step of utilizing said sensor to monitor the physical condition of the inside surface of the storage compartment comprises monitoring the ambient light within the compartment.

2. The method of claim 1, further comprising the step of commencing logging data regarding the compartment upon a triggering event.

3. The method of claim 2, wherein said triggering event is a change in output from the sensor.

4. A method for monitoring a transport storage compartment, said method comprising the steps of:
   positioning a monitoring unit having a sensor and a transmitter inside said storage compartment;
   utilizing said sensor to monitor the physical condition of the inside surface of the storage compartment; and
   utilizing said transmitter to transmit a signal based on the physical condition of the inside surface of the storage compartment,
   wherein the step of utilizing said sensor to monitor the physical condition of the inside surface of the storage compartment comprises emitting a signal from said sensor to reflect on an inside surface of said compartment.

5. The method of claim 4, further comprising the step of utilizing said sensor to receive a signal reflected by said inside surface.

6. The method of claim 4, wherein said inside surface is an access port to said surface.

7. The method of claim 4, further comprising the step of commencing logging data regarding the compartment upon a triggering event.

8. A method of monitoring a cargo transport compartment, said method comprising the steps of:
   positioning a monitoring unit at a location within a cargo transport compartment in proximity to an inside surface of the compartment, the monitoring unit including a proximity sensor and a radio transmitter; and
   upon sensing a change in an output of the proximity sensor, transmitting an identifier for the monitoring unit for receipt by a reader using the radio transmitter,
   wherein said change in output results from opening said compartment.

9. The method of claim 8, wherein said step of opening is opening an access port.

10. The method of claim 8, wherein said step of opening is creating an opening in said compartment.

11. A method of monitoring cargo in a shipping container comprising the steps of:
    attaching a monitoring unit to an inside surface of the shipping container, the monitoring unit including a sensor, monitoring electronics and a radio transmitter, wherein said sensor is a reflective energy sensor;
    utilizing said reflective energy sensor to reflect energy off an inside surface of said shipping container;
    upon receiving a radioed start command from a reader, commencing logging data on triggering events in a memory of the monitoring unit with a time stamp, a triggering event being a chance in an output of the sensor, and
    upon receiving a radioed get-response command from a reader, transmitting the data on triggering events to the reader.

* * * * *